United States Patent [19]
Fletcher et al.

[11] 3,730,287
[45] May 1, 1973

[54] VEHICLE FOR USE IN PLANETARY EXPLORATION

[76] Inventors: James C. Fletcher, Administrator of the National Aeronautics and Space Administration with respect to an invention of; Edward Hryniewiecki, Sherman Oaks, Calif.

[22] Filed: May 17, 1971

[21] Appl. No.: 144,139

[52] U.S. Cl. .................180/6.5, 180/7 R, 180/8 A, 180/9.2 R, 180/9.5, 180/41, 305/35 EB, 305/39
[51] Int. Cl. .............................................B62d 11/04
[58] Field of Search ..................180/6.7, 9.2 R, 9.46, 180/7 R, 8 R, 8 A, 41, 43 R, 46, 45, 6.5

[56] References Cited

UNITED STATES PATENTS

| | | | |
|---|---|---|---|
| 2,172,177 | 9/1939 | Rose | 180/45 |
| 3,348,518 | 10/1967 | Forsyth et al. | 180/8 A X |
| 2,361,165 | 10/1944 | Arthur | 305/39 X |

*Primary Examiner*—Benjamin Hersh
*Assistant Examiner*—John A. Pekar
*Attorney*—John R. Manning, Monte F. Mott and Wilfred Grifka

[57] ABSTRACT

A self-propelled vehicle particularly suited for use in traversing hostile terrain. The vehicle is characterized by a plurality of mutually independently operable propulsion units, each including an extended leg coupled with the frame of the vehicle for rotation about an axis transversely related thereto and supported by a steerable pedestal having operational attributes of both a wheel and an endless track and employable for propelling the vehicle along a given surface, through a selectively operable power train functioning to drive the leg in rotation about its axis and/or activating the pedestal in a wheel-driven and/or track-laying mode of operation.

9 Claims, 19 Drawing Figures

Patented May 1, 1973

EDWARD HRYNIEWIECKI
INVENTOR

ATTORNEYS

Patented May 1, 1973

EDWARD HRYNIEWIECKI
INVENTOR

Wilfred Grifka
Monte F. Mott
ATTORNEYS

EDWARD HRYNIEWIECKI
INVENTOR

Wilfred Grifho
Monte F. Mott
ATTORNEYS

VEHICLE FOR USE IN PLANETARY EXPLORATION

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The invention relates to self-propelled vehicles and more particularly to a self-propelled vehicle having the attributes of a "walking vehicle", a "wheeled vehicle" and a "track-laying vehicle".

2. Description of the Prior Art

Currently, numerous types of vehicles are employed in traversing rugged and generally hostile terrain. Among such vehicles are those commonly referred to as walking vehicles, wheeled vehicles and track-laying vehicles.

Each of these vehicles is particularly suited for use in a given environment wherein the characteristics of given surfaces generally are known. For example, where an encountered surface is quite soft, track-laying vehicles function quite satisfactorily, walking vehicles, on the other hand, are particularly suited for use in more rugged terrain, having good load-supporting characteristics, while wheeled vehicles tend to be more maneuverable and normally are of less mass, made possible through simplistic construction. Consequently, difficulty often is encountered in designing a single type of vehicle for use in a variety of environments, as may occur in space exploration, wherein the surface characteristics vary widely from a soft planar surface to a surface characterized by rugged rocks and large fissures and bearing layers of motion inhibiting materials having textures ranging between a powder and extremely coarse aggregate.

Therefore, there currently exists a need for a practical, self-propelled vehicle which is highly maneuverable, readily is employable in negotiating slopes, of both a positive and a negative nature, traversing soft and smooth surfaces as well as hard aggregate-bearing surfaces, crossing large fissures, and is capable of maintaining position stability while being economic to manufacture and deliver to surfaces of selected planetary bodies, and employed in various combinations of modes of locomotion.

OBJECTS AND SUMMARY OF THE INVENTION

It is therefore an object of the instant invention to provide an improved vehicle.

It is another object to provide an improved, self-propelled vehicle capable of being propelled through a flexible mode of locomotion.

It is another object to provide an improved, self-propelled vehicle having the attributes of a walking vehicle, a wheeled vehicle and a track-laying vehicle.

It is another object to provide a vehicle having a propulsion system including a plurality of independently operable drive units, each unit having the attributes of a "walking leg", a wheel, and an endless track.

It is another object to provide for use in vehicles of the type employed in traversing rugged terrain, a propulsion system including a segmented leg supported by a steerable pedestal having a load-supporting terminal component circumscribed by an endless rim.

These and other objects and advantages are achieved through a vehicle including a propulsion system coupled with a load-supporting frame and including a plurality of drive units, each unit having a leg extended from the frame and supported for rotation about a first axis transversely related to the frame, and a steerable pedestal depending from the leg provided with a rotatable hub supported for rotation about a second axis extending parallel to said first axis and having a plurality of radially extended spokes circumscribed by an endless rim supported for circulation along an endless path circumscribing the distal ends of the spokes.

DESCRIPTION OF THE PREFERRED EMBODIMENT

Figure 1:
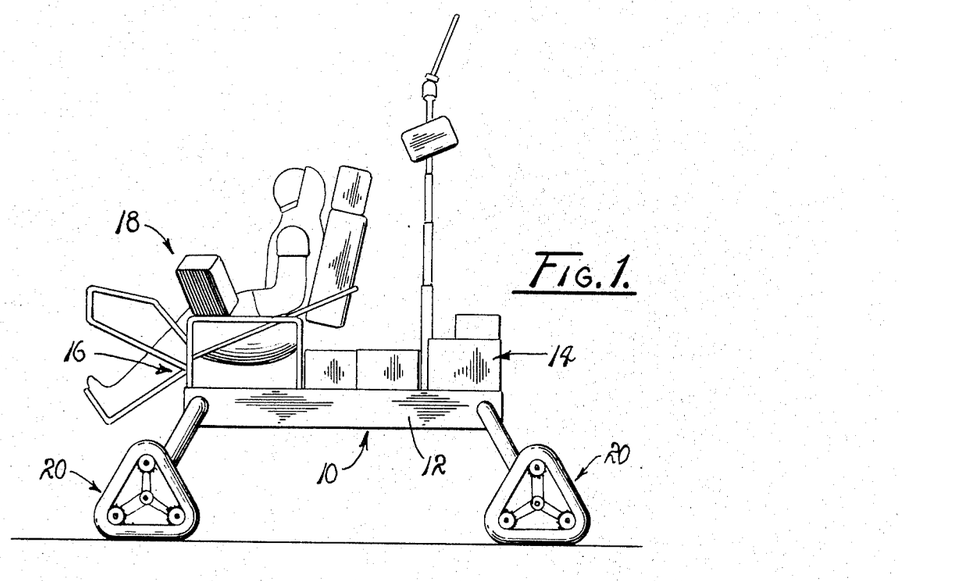
FIG. 1 is a side elevation of a vehicle supported by a plurality of drive units which embody the principles of the instant invention.
Figure 2:
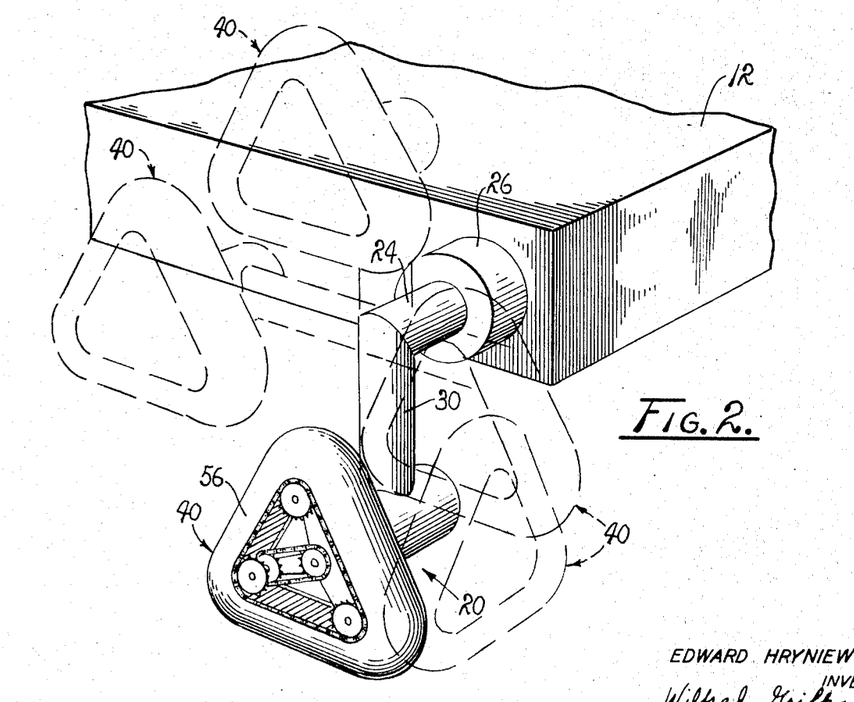
FIG. 2 is a perspective, schematic view collectively depicting various positions which may be assumed by each of the drive units during the operation of the vehicle shown in FIG. 1.

Referring now to the drawings wherein like reference characters designate like or corresponding parts throughout the several views, there is shown in FIG. 1 a vehicle 10 which embodies the principles of the instant invention.

As shown, the vehicle 10 includes a load-bearing frame 12 which serves as a traveling support for selected equipment of a general nature, designated 14, and a vehicle operator O seated thereon and supported through suitable structural components, generally designated 16.

Figures 5, 6, 7, 8:
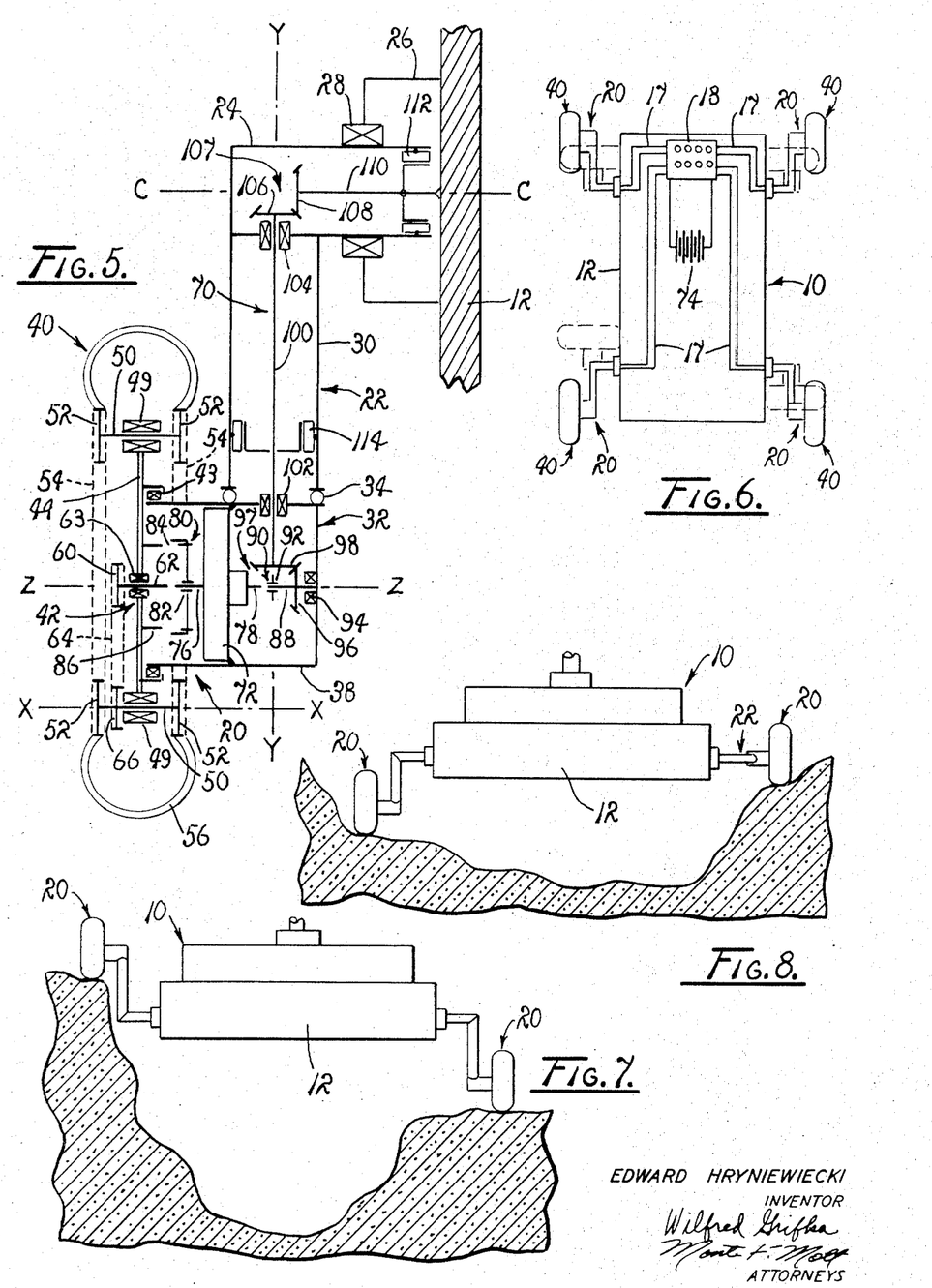
FIG. 5 is a partially sectioned, schematic view of the drive unit shown in FIG. 3.
FIG. 6 is a schematic view of the vehicle illustrated in FIG. 1, depicting a control circuit employable by an operator in controlling the operation of the vehicle shown in FIG. 1.
FIGS. 7 and 8 are similar exemplary views collectively depicting successive positions assumed by the drive units of the vehicle of FIG. 1 as the vehicle is caused to traverse a rugged terrain having non-uniform surface characteristics.
Figure 9A:
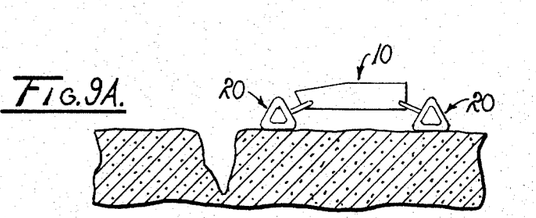
FIGS. 9A through 9E collectively illustrate an operational sequence for the vehicle of FIG. 1 as it is caused to traverse a crevice.
Figure 9B:
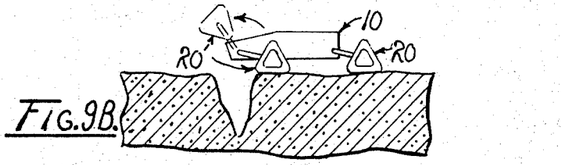
Figure 9C:
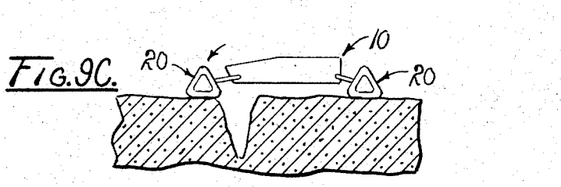
Figures 9D, 9E:
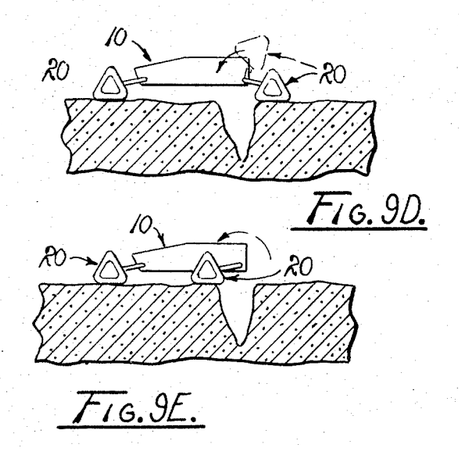
Figure 10A:
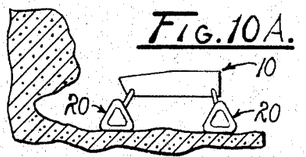
FIGS. 10A through 10F collectively illustrate an operational sequence for the vehicle of FIG. 1 as it is caused to traverse a severely inclined surface.
Figure 10B:
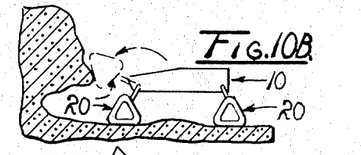
Figure 10C:
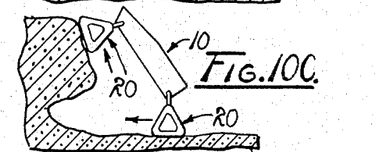
Figure 10D:
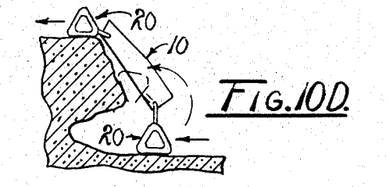
Figure 10E:
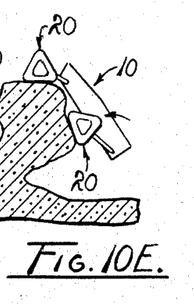
Figure 10F:
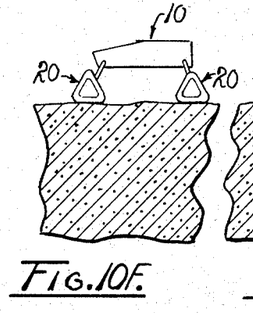

The vehicle 10 is, in operation, controlled through an electrical circuit 17, FIG. 6, and coupled with a suitable control panel, generally designated 18. The control panel 18 preferably includes a plurality of switches, levers and buttons suited to be manipulated by the operation O for purposes of controlling the operation of the vehicle 10 as it traverses a given surface of terrain of either a celestial or terrestrial origin. It is to be understood, however, that while an electrical circuit is shown in the drawings, the particular control mechanism employed in controlling the operation of the vehicle 10 can be varied as is found desirable for a given set of operational parameters.

The vehicle 10 is supported and propelled through a plurality of appropriately situated drive units, generally designated 20. Each of the drive units 20 is provided with a tubular leg 22 having angularly related segments. The leg 22 includes a base segment 24 pivotally coupled with a frame 12 of the vehicle 10. A suitable bearing coupling mounted in a closed housing 26 preferably is employed for this purpose. Since the bearing coupling and closed housing 26 can be of any suitable design, a detailed description thereof is omitted in the interest of brevity. However, it is to be understood that the bearing coupling is fixed to the frame 12 through a judicial use of studs, welds and the like. Furthermore, the bearing coupling is provided with a bearing race 28 associated with the housing 26, FIG. 5, which concentrically receives an end portion of the base segment 24 in order to join the leg 22 with the frame 12 so that the leg 22 is supported for pivotal displacement about an axis C—C, FIG. 5, transversely related to the frame 12.

Orthogonally related to the base segment 24 of a leg 22 there is an intermediate segment 30 which is welded or otherwise coupled with the base segment 24 and becomes an integral part thereof. At the distal end of the intermediate segment 30, there is a pedestal 32 rotatably coupled with the segmented leg 22 through a coupling including a thrust bearing 34 of a suitable design. The pedestal 32 preferably is related to the intermediate segment 30 and the base segment 24 of the segmented leg 22 in a manner such that its longitudinal axis, designated Z—Z, parallels the axis C—C of the base segment 24 and is normally related to the longitudinal axis of the intermediate segment 30, designated Y—Y in FIG. 5.

As a practical matter, the pedestal 332 is so coupled with the intermediate segment 30, through the thrust bearing 34 as to permit it to be rotated about the axis Y—Y, however, since the specific manner in which the pedestal 32 is coupled with the intermediate segment 30 can be varied as desired, for a selected use in a given environment, a detailed description thereof is omitted in the interest of brevity.

The pedestal 32 includes a housing 38, also of a tubular configuration, and supports at its outermost end a load-bearing terminal component 40. The terminal component 40 is of a triangular configuration and possesses the combined attributes of a foot, a wheel, and an endless track. Through the use of the terminal component 40, the vehicle 10 is rendered capable of coping with the total spectrum of surfaces normally encountered in traversing terrain of a variable nature.

Figures 3, 4:
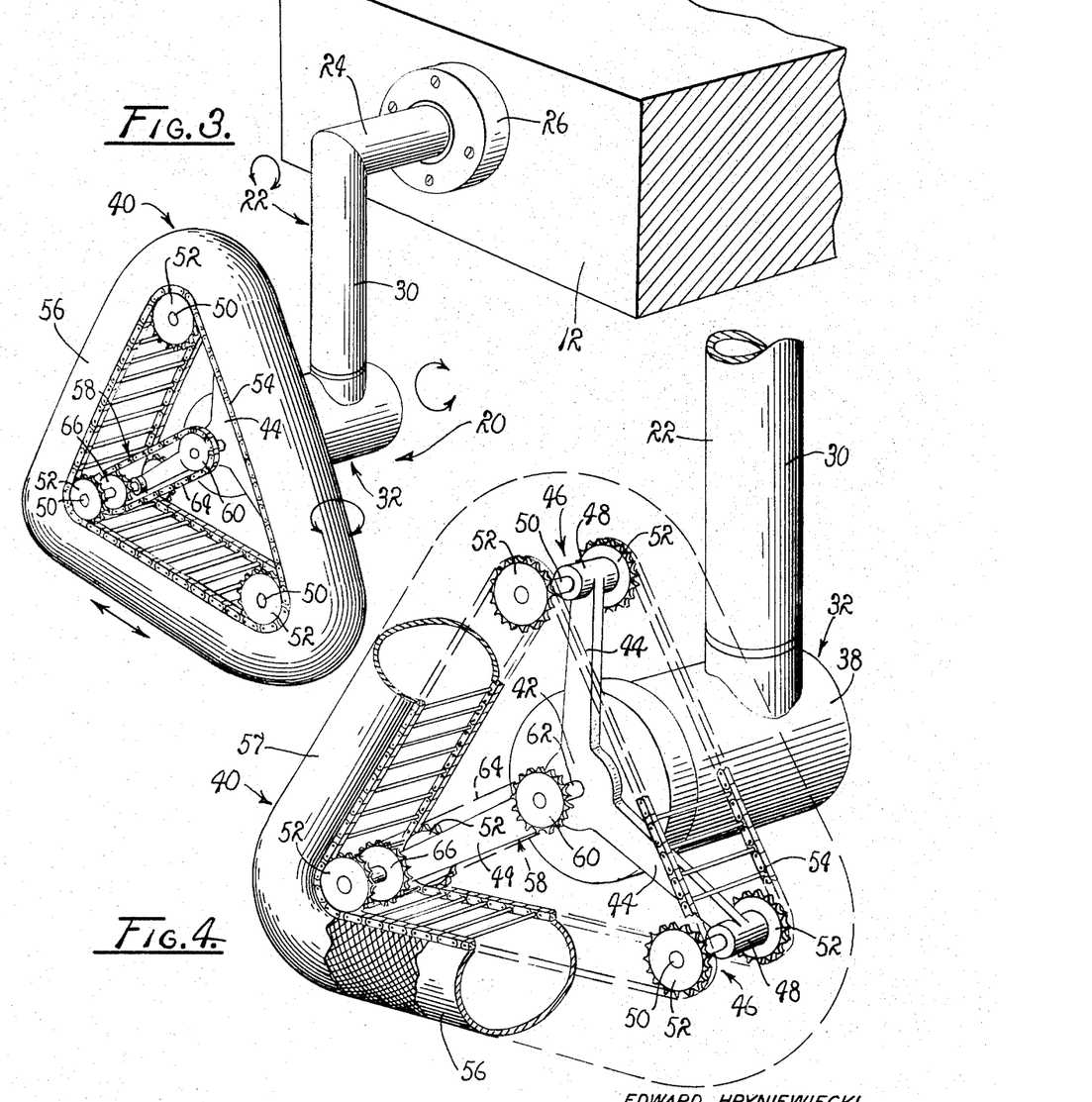
FIG. 3 is a perspective view, on an enlarged scale, of a leg and pedestal which together function as a drive unit.
FIG. 4 is a fragmented, perspective view, on an enlarged scale, of a pedestal employed by the drive unit illustrated in FIG. 3.

As best illustrated in FIG. 4, the terminal component 40 includes a hub 42, supported by a suitable bearing 43, FIG. 5, suitably mounted about the distal portion of the housing 38 of the pedestal 32. The hub 42 includes a plurality of radiating, arm-like spokes 44, preferably spaced 120° apart about its periphery. The terminals of the spokes 44 are spaced at equidistances from the axis Z—Z and support a plurality of sprocket assemblies 46. Each of the sprocket assemblies 46 is of a suitable design and is coupled with a given spoke 44 through a bearing sleeve 48. The bearing sleeves 48 include bearings 49, FIG. 5, which, in turn, serve to support an axle 50 for rotation about axis X—X. At each end of the axle 50 there is a sprocket wheel 52 fixed thereto. However, various types of sprockets and mountings for sprockets can be employed equally as well.

About the thus provided plurality of sprocket wheels 52 there is trained and endless chain 54, of a track-like configuration, which meshes with the teeth of the sprocket wheels 52 in order to establish a driving relationship therebetween. Hence, it can be appreciated that by driving one of the sprocket assemblies 46, in either direction about the axis X—X, the chain 54 is caused to progress in circulation along an endless path circumscribing the distal ends of the spokes 44 of the hub 42.

Mounted on the chain 54 there is an endless, flexible tire 56. The tire 56 includes a body preferably formed of a resilient material such as an expanded metal mesh which is both durable and resilient. Since, in practice, metal mesh permits dust, mud, and the like readily to pass therethrough without unduly burdening the tire, mesh can be employed without a covering. However, a suitable fabric covering, designated 57, preferably is employed in covering the mesh.

Since the particular manner and materials employed in fabricating the tire 56 are matters of convenience, a detailed description thereof is omitted in the interest of brevity. It is, however, to be understood that the tire 56 is flexible enough to be shaped to a triangular configuration, and when in contact with the surface of the terrain is sufficiently resilient for forming a substantially flat, elongated "footprint" and, in effect, serves as a segment of a "track" similar to that often provided for so-called track-laying vehicles.

When compared to a circular wheel of an equivalent diameter and tread width, the footprint established by the tire 56 reduces ground pressure by a factor of approximately 2.5. The resulting distribution of ground-loading, when employing the terminal component 40, is particularly suited for traveling over terrain having relatively poor load-bearing characteristics.

The chain 54 is, in operation, driven through a chain-and-sprocket drive unit, generally designated 58. As currently employed, the chain-and-sprocket drive unit 58 includes a driving sprocket wheel 60 rigidly coupled to an output shaft 62, supported by a suitable bearing 63, FIG. 5, and an endless chain 64 trained about a driven sprocket wheel 66 fixed to an axle 50 of one of the sprocket assemblies 46. Accordingly, it can be appreciated that as rotation is imparted to the output shaft 62 the chain 64 is driven to impart rotation to the sprocket wheel 66 for thus imparting rotation to the axle 50. As the axle 50 is advanced, the chain 54 and the tire 56 also are advanced about the sprocket assemblies 46 supported by the distal ends of the spokes 44. Thus the tire 56 is driven in circulation about the sprocket assemblies 46.

It is important to note that the hub 42 is supported for rotation about an axis designated Z—Z, FIG. 5, hence, this axis serves as an axis of rotation for the spokes 44. Where unrestricted rotation of the hub 42, about the axis Z—Z is accommodated, in a so-called "-free-wheeling" mode, the terminal component 40 is permitted continuously to reorient its position relative to the surface of the terrain engaged thereby. Thus, the terminal component 40 is capable of maintaining operative engagement with a surface of uneven terrain as it is afforded an opportunity to undergo a rocking motion about the axis Z—Z. Such capability is, for the sake of convenience, termed articulation.

Each of the drive units 20 is provided with a segmented power train 70, FIG. 5, through which rotation is imparted to the sprocket assemblies 46, about the axis X—X, the hub 42, about the axis Z—Z, the pedestal 32, about the axis Y—Y, and the leg 22, about the axis C—C.

The power train 70 schematically is illustrated in FIG. 5 for the sake of simplicity. However, it is to be understood that the power train 70, including its various components, is fabricated in a manner consistent with known machine design and fabrication techniques. Therefore, a detailed description of the specific structural components employed in the power train 70 is omitted in the interest of brevity.

Preferably, the power train 70 includes a prime mover or intermittently operated motor 72 seated within the housing 38 of the pedestal 32. The motor is energized by a portable source 74 of electrical potential coupled therewith. The motor 72 is a (Direct Current) D.C. motor having high-torque characteristics and is provided with a pair of coaxially related input shafts 76 and 78 for the power train 70. These shafts preferably are integrated and simultaneously provide an input from the motor 72.

In practice, the input shaft 76 is coupled with a dual clutch assembly 80. This assembly includes a first clutch coupling 82, and an independently operable second clutch coupling 84. The coupling 82 serves to couple the input shaft 76 with the output shaft 62, while the second clutch coupling 84 serves to couple the shaft 76 with a suitable drive-ring 86 rigidly fixed to the hub 42 in a concentric relationship with the output shaft 62. The drive-ring 86 is of any suitable design which permits the hub 42 to be driven thereby.

The clutch assembly 80 can be varied as is found desirable for given operational parameters. However, the clutch couplings 82 and 84 preferably include displaceable friction surfaces which function quite satisfactorily for this purpose and are employed in a manner consistent with known principles of machine design.

It is to be understood, however, that in the event the first clutch coupling 82 is engaged, a driving coupling is established between the shaft 76, of the motor 72, and the output shaft 62, whereupon the chain-and-sprocket drive unit 58 is activated for causing the tire 56 to circulate about the sprocket assemblies 46.

Similarly, in the event the second clutch coupling 84 is engaged, the shaft 76, of the motor 72, is coupled with the drive-ring 86 for imparting rotation to the hub 42 so that the spokes 44 of the terminal component 40 are driven in rotation about the axis Z—Z.

Accordingly, it should be appreciated that the terminal component 40 is, in operation, selectively driven in modes of operation wherein the tire 56 is caused to circulate about the distal ends of the spokes 44 and/or the hub 42 simultaneously is rotated about the axis Z—Z. Through a selective employment of the clutch assembly 80, the terminal component 40 can be operated in these modes in sequence or, if desired, concurrently.

The input shaft 78, FIG. 5, is coupled with an output drive shaft 88 through a selectively operable clutch assembly 90 of a design somewhat similar to the clutch assembly 80. It is to be understood, however, that the clutch assembly 90 includes a single clutch component 92, preferably a fiction clutch component, which serves selectively to couple the drive shaft 88 with the shaft 78 of the motor 72.

The drive shaft 88 is supported within the housing 38 of the pedestal 32 for free rotation about the axis Z—Z, by a suitable bearing 94, and concentrically supports a first bevel Gear 96 of a bevel gear coupling 97. The bevel gear 96 is meshed with a bevel gear 98 supported for rotation about the axis Y—Y at the adjacent end of a drive shaft 100. As a practical matter, the drive shaft 100 is supported in a concentric relationship within the segment 30 through a plurality of suitably supported bearings, including bearings 102 and 104 mounted within the segment 30. Hence, it is to be understood that through the clutch assembly 90, the bevel gear coupling 97 serves to impart a driving rotation to the shaft 100 as it is supported for rotation by the bearings 102 and 104.

At the end of the shaft 100 opposite the bevel gear 98, there is provided another bevel gear 106 of a bevel gear coupling 107. This bevel gear is meshed with a bevel gear 108 rigidly fixed to an anchor shaft 110 welded or otherwise rigidly secured to the frame 12 within the bearing housing 26 in a manner such that the shaft 110 is supported against rotation relative to the axis C—C and the frame 12 of the vehicle 10. It should therefore be apparent that the bevel gear coupling 97 functions as an input coupling while the bevel gear coupling 107 functions as an output coupling for the power train 70.

It is important to note that the clutch assemblies 80 and 90 are each provided with actuating means of any suitable design, including electromagnets and the like which function quite satisfactorily for this purpose. Since the clutch actuators are well known and can be varied as is found desirable, a detailed description of the actuators for the assemblies 80 and 90 is omitted in the interest of brevity. However, it is to be understood that solenoids, not shown, preferably are employed, although other types of actuators can be employed equally as well.

As illustrated in FIG. 5, the shaft 110 concentrically supports an expandable friction brake 112, while the shaft 100 similarly supports an expandable friction brake 114. The brake 112 is configured to expand into locking engagement with a braking surface, not designated, circumscribing the internal surface of the base segment 24 of the segmented leg 22, while the brake 114 is configured to expand into locking engagement with an annular braking surface, also not designate, circumscribing the internal surfaces of the intermediate segment 30. Thus, the brakes 112 and 114 act to inhibit relative rotation between the associated shafts and the segments of the leg 22. While not shown, it will be appreciated that, where desired, the drive shaft 88 can be provided with an expandable brake similar to the brakes 112 and 114 for precluding rotation of the pedestal 32.

As should readily be apparent from a cursory examination of FIG. 5, in order to impart rotation of the segmented leg 22 and the associated pedestal 32 relative to the axis C—C, a coupling of the clutch assembly 90 is effected, whereupon the input coupling 97 is driven by the motor 72. As the motor 72 drives the coupling 97, the gear 106 of the coupling 107 is advanced about the periphery of the bevel gear 108. Thus the leg 22 is angularly displaced about the axis C—C, as the shaft 110 is retained in a stationary position, relative to the frame 12, in order to provide a reactive torque therewith.

In the event it becomes desirable to rotate the pedestal 32 about the axis Y—Y, the brakes 112 and 114 are expanded into locking engagement with the adjacent braking surfaces of the segments 24 and 30 for thereby freezing the shaft 100 against rotation. With the shaft 100 frozen against rotation, an engagement of a clutch assembly 90 causes the bevel gear 96 of the coupling 97 to advance about the periphery of the bevel gear 98 for thus angularly displacing the pedestal about the axis Y—Y.

In view of the foregoing, it should readily be apparent that by selectively employing the clutch assemblies 80 and 90 in conjunction with the brakes 112 and 114, selective rotation can be imparted to the pedestal 32 and/or to the segmented leg 22 of the drive unit 20, while concurrently therewith, the tire 56 can be circulated about the sprocket assemblies 46 and/or the hub 42 driven in rotation about the axis Z—Z. Thus the drive unit 20 can be caused to function in a walking mode, a steerable rolling mode and a steerable track-laying mode.

It is important to understand that steering of the circulating tires 56 is achieved through a rotation of the pedestal 32. Furthermore, the drive units 20 can be operated independently of each of the other units. Accordingly, the control circuit 17 includes suitable circuit leads coupling the control panel 18 with the selectively operable components of each of the drive units 20, as illustrated in FIG. 6, in order to impose selective gain control over the operation of the vehicle 10 by independently controlling the operation of the units 20.

By employing the control circuit 17 and the panel 18, the vehicle 10 can be caused to traverse various types of terrains with the drive units 20 oriented in selected orientation relative to the frame 12 of the vehicle 10 and functioning in multiple modes of operation, simultaneously or in a selected sequence. For example, as shown in FIGS. 7 and 8, the legs 22 of the drive units 20 are rotatably advanced from the positions illustrated in FIG. 1 while the drive units 20 continue to function in modes dictated through a manipulation of the panel 18.

In order to better illustrate the utility of accommodating rotary displacement of the drive unit 20, the associated pedestal 32 and the terminal component 40, attention is directed to FIGS. 9A through 9E which collectively illustrate, in schematic form, one manner in which the drive units 20 are employed for achieving a crossing of large crevices. Since each of the units 20 is subject to independent control, the vehicle 10 initially is advanced to the edge of the crevices and the drive units 20 sequentially rotated about the axis C—C for successively advancing the drive unit to the opposite side of the crevice in a sequence which effects a "stepping" across the crevice in a manner consistent with the operation of a walking vehicle.

FIGS. 10A through 10E collectively illustrate one manner in which the vehicle 10 can be utilized in climbing to a plateau of a rather severely inclined surface. In such instances, the tires 56 are caused to circulate the sprocket assemblies 46, the hub 42 is rotated about the axis Z—Z while the segmented leg and pedestal of the drive unit are rotated about the axis C—C in a manner such that the vehicle 10 is afforded an opportunity to "climb" the surface of the obstruction by "stepping" the terminal components 40 into engagement with the face of the obstruction while driving the tire 56 in circulation about the sprocket assemblies until such time as rotary motion is desired for the hubs 42 so that the vehicle 10 is afforded an opportunity to climb the face of the obstruction.

OPERATION

It is believed that in view of the foregoing description, the operation of the device will be readily understood and it will be briefly reviewed at this point.

An operation O seated upon the vehicle 10 is supported access to the panel 18 for purposes of steering the vehicle 10 along a given surface, regardless of its load-bearing characteristics, being traversed by the vehicle. Through a selected manipulation of switches and the like, not designated, the operator O is afforded an opportunity to control the drive units 20 of the vehicle 10.

When the vehicle 10 is operating in a wheel-driven or track-laying mode, the brakes 112 and 114 normally are in an activated state, whereby rotation of the leg 22 and the pedestal 32 is precluded.

Preferably, the first clutch assembly 82 of the clutch assembly 80 is engaged for causing the shaft 62 to drive the chain-and-sprocket drive units 58 in a manner such that the driven sprocket wheel 66 imparts rotation to the axle 50 for thus driving the tire 56 in circulation about the sprocket assemblies 46 supported at the distal end of the spokes 44 whereby the vehicle 10 is caused to operate in a crawling or track-laying mode of operation. Since the second clutch coupling 84 is disengaged, each of the terminal components 40 is afforded a rocking motion or permitted to articulate in order to accommodate itself to the inclination of surface being traversed.

In the event it becomes desirable to drive the terminal components 40 of any or all of the drive units 20 in rotation in a manner such that the terminal component 40 functions as a "wheel", the second clutch coupling 84 is engaged whereupon the shaft 76 serves to drive the hub 42 in rotation about the axis Z—Z through the drive-ring 86.

In the event it becomes desirable to steer or alter the direction in which the vehicle is traveling, regardless oF whether the vehicle is operating in a track-laying or wheeldriven mode, the pedestal 32 is driven in rotation about the axis Y—Y, through a selected energization of the motor 72, for thus redirecting the direction of travel for the terminal components 40 for appropriate drive units 20. In order to achieve desired rotation of the pedestal 32, the clutch assemblieS 90 of selected drive units 20 are engaged while the brakes 112 and 114 frictionally lock the shafts 110 and 100 to the concentrically related segments of the leg 22. Hence, the bevel gear 96 is driven in circular motion about the periphery of the bevel gear 98 for thus redirecting the axis Z—Z so that the pedestal 32 iS caused to rotate through a selected angle about the axis Y—Y, whereupon the clutch assemblies are again disengaged. Thus the direction of travel for the terminal components of the selected drive units is altered.

Should it become desirable to operate the vehicle 10 in a walking mode, the motor 72 is energized, the clutch assembly 90 is engaged, for thereby driving the coupling 97, with the brakes 112 and 114 having been released, whereupon the leg 22, with its associated pedestal 32, is driven in rotation about the axis C—C as the bevel gear advances about the periphery of the bevel gear 108.

It is important to note that so long as the brake 112 is engaged with the base segment 24 of the segmented leg 22 rotation of the segmented leg about the axis C—C is precluded even though the shaft 100 is afforded rotation. Consequently, it is desirable to simultaneously engage and release the brakes 112 and 114 when operating the vehicle in a walking mode.

In view of the foregoing, it should readily be apparent that the vehicle of the instant invention provides a practical solution to the perplexing problem of providing a vehicle which readily accommodates its operation to a hostile terrain through multiple modes of operation.

Although the invention has been herein shown and described in what is conceived to be the most practical and preferred embodiment, it is recognized that departures may be made therefrom within the scope of the invention, which is not to be limited to the illustrative details disclosed.

What is claimed is:
1. A vehicle comprising:
A. a load supporting frame;
B. a plurality of legs extended from said frame, each leg being coupled at its base to said frame and supported for pivotal displacement about a first axis of rotation transversely related to the frame; an:
C. a propulsion system for propelling said frame including a plurality of pedestals coupled to the distal ends of said legs and supported for pivotal displacement about a second axis of rotation angularly related to said first axis of rotation, and a terminal component mounted on each of said pedestals in supporting relation therewith including,
  1. a rotatable hub and a plurality of angularly related arms radially extended from the hub and terminating at equidistances from a third axis of rotation angularly related to said first axis of rotation,
  2. a plurality of sprockets, each being rotatably supported at the distal end of one of said arms,
  3. an endless rim including a flexible chain operatively meshed with said sprockets and a resilient body formed of An expanded mesh circumscribing the periphery of the component and supported for advancement along an endless path circumscribing said second axis of rotation, and
  4. a selectively operable power train comprising a plurality of electrically energizable motors, each being supported within one of said pedestals, and a selectively engageable clutch and brake system including means for selectively coupling each of the motors with one of said legs for driving the leg in rotation about said first axis of rotation, means for selectively coupling each of said motors to one of said pedestals for driving the pedestal in rotation about said second axis of rotation, means for selectively coupling each of the motors with one of the terminal components for driving the hub in rotation about the third axis of rotation, means for selectively coupling each of said motors with one of said rims, and for advancing the rim along said path.

2. A vehicle for traversing rough terrain comprising:
A. a load supporting frame;
B. a plurality of frame supporting legs, each leg being coupled at its base with said frame and supported for angular displacement about a first axis of rotation, said first axis being transversely related to said frame;
C. a propulsion system including,
  1. a plurality of pedestals, each pedestal being coupled with the distal end of one of said legs and supported for rotational displacement about a second axis of rotation, said second axis being coincident with the longitudinal axis of symmetry of the leg to which the pedestal is coupled and angularly related to the first axis of rotation, nd
  2. a terminal component of a substantially triangular configuration supported for rotation about a third axis of rotation, said third axis being coincident with the longitudinal axis of symmetry of said pedestal and angularly related to said second axis of rotation; and
D. a selectively operable drive system including an electrically energizable motor seated in each of said pedestals, and
  1. clutch means for selectively coupling each of said legs in driving relation with one of said motors for driving the legs in rotation about said first axis of rotation,
  2. clutch means for selectively coupling each of said pedestals in driving relation with one of said motors for driving the pedestals in rotational displacement about said second axis of rotation, and
  3. clutch means for selectively coupling each of said terminal components in driving relation with one of said motors for driving the terminal components in rotation about said third axis of rotation.

3. A vehicle for traversing relatively rough terrain comprising:
A. a load supporting frame;
B. a plurality of frame-supporting legs, each leg being coupled at its base with said frame and supported for rotation about a first axis of rotation, said first axis being transversely related to said frame;

C. a propulsion system including,
1. a plurality of pedestals, each of said pedestals being coupled with the distal end of one of said legs and supported for rotational displacement about a second axis of rotation, said second axis being angularly related to said first axis of rotation,
2. a terminal component of a substantially triangular configuration supported for rotation about a third axis of rotation, Paid third axis being angularly related to said second axis of rotation; and
3. a selectively operable drive system including, a selectively energizable motor seated in each of said pedestals and a drive train extended through each of said pedestals and each of said legs, said drive train having included therein a selectively operable clutch and brake means for driving the leg through which it is extended in rotation about said first axis of rotation, selectively operable clutch and brake means for driving the pedestal through which it is extended in rotational displacement about said second axis of rotation, and clutch and brake means for driving each of the terminal components in rotation about said third axis of rotation.

4. The vehicle of claim 3, wherein each of said legs is restrained against displacement as the pedestal coupled therewith is driven in rotational displacement about said second axis of rotation.

5. The vehicle of claim 4, wherein the terminal components of each pedestal include a circumscribing rim and means for advancing the rim about the periphery thereof.

6. The vehicle of claim 5 wherein the means for advancing the rim includes a chain-and-sprocket coupling.

7. The vehicle of claim 6, wherein said means for advancing the rim further includes additional clutch means for releasably coupling said chain-and-sprocket with said drive means.

8. In a propulsion system for a vehicle, the improvement comprising:
A. a segmented leg including,
1. a base segment rotatably coupled with means defining a frame for the vehicle and supported for rotation about a first axis transversely related to said frame, and
2. an intermediate segment rigidly coupled with said base segment and angularly related thereto;
B. a pedestal extended from said intermediate segment and supported for rotation about the longitudinal axis thereof;
C. a terminal component operatively associated with said pedestal for propelling the vehicle including,
1. a hub supported for rotational displacement about a concentric axis coincident with an axis of rotation angularly related to said longitudinal axis,
2. a plurality of radiating, coplanar spokes extended from said hub, and
3. an endless rim circumscribing said terminal component and mounted for advancement along an endless path transversing the distal ends of said spokes; and
D. a selectively operable, common drive means coupled with the leg, the terminal component, and the pedestal for selectively imparting thereto rotational displacement.

9. The improvement of claim 8 wherein the common drive includes:
A. an electrically energizable motor, supported in said pedestal, a pair of output shafts operatively aSsociated with said motor;
B. a segmented power train extending from said pedestal, through said leg to said frame, and clutch means for releasably coupling the segmented power train with one output shaft of said pair of output shafts;
C. a bifurcated power train, including a first and a second power train segment, operatively associated with the other output shaft of said pair of output shafts; and
D. clutch means for releasably coupling a first power train segment with the other output shaft of said pair, and clutch means for releasably coupling the second power train segment with the other output shaft.

* * * * *